United States Patent
Veinotte et al.

(10) Patent No.: US 6,848,432 B2
(45) Date of Patent: Feb. 1, 2005

(54) PURGE CONTROL DEVICE FOR LOW VACUUM CONDITION

(75) Inventors: Andre Veinotte, Dresden (CA); Paul Perry, Chatham (CA)

(73) Assignee: Siemens VDO Automotive, Inc., Chatham (CA)

(*) Notice: Subject to any disclaimer, the term of this patent is extended or adjusted under 35 U.S.C. 154(b) by 0 days.

(21) Appl. No.: 10/465,867

(22) Filed: Jun. 20, 2003

(65) Prior Publication Data

US 2004/0255912 A1 Dec. 23, 2004

(51) Int. Cl.⁷ .............................. F02M 25/08
(52) U.S. Cl. ..................... 123/520; 123/516
(58) Field of Search .................. 123/458, 460, 123/497, 516, 518, 519, 520, 521

(56) References Cited

U.S. PATENT DOCUMENTS

| | | | |
|---|---|---|---|
| 2,489,230 A | * 11/1949 | Winkler | 123/572 |
| 3,741,179 A | 6/1973 | Vartanian | |
| 4,094,285 A | 6/1978 | Oyama et al. | |
| 4,171,689 A | 10/1979 | Eheim | |
| 4,196,708 A | 4/1980 | May et al. | |
| 4,214,562 A | 7/1980 | Mowbray | |
| 4,222,356 A | 9/1980 | Ueda | |
| 4,230,080 A | 10/1980 | Stumpp et al. | |
| 4,237,837 A | 12/1980 | Toda et al. | |
| 4,279,235 A | 7/1981 | Flaig et al. | |
| 4,279,473 A | 7/1981 | Yamana | |
| 4,280,470 A | 7/1981 | Ueda | |
| 4,286,567 A | 9/1981 | Ueda | |
| 4,295,456 A | 10/1981 | Nomura et al. | |
| 4,329,965 A | 5/1982 | Ueda et al. | |
| 4,364,369 A | 12/1982 | Nomura et al. | |
| 4,690,119 A | 9/1987 | Makino et al. | |
| 4,703,738 A | * 11/1987 | DeMinco et al. | 123/520 |
| 5,305,720 A | 4/1994 | Ando et al. | |
| 5,333,456 A | 8/1994 | Bollinger | |
| 5,682,863 A | * 11/1997 | Kadooka | 123/520 |
| 5,727,530 A | * 3/1998 | Honda et al. | 123/520 |
| 5,785,034 A | 7/1998 | Moedinger et al. | |
| 5,937,834 A | 8/1999 | Oto | |
| 5,937,835 A | 8/1999 | Turner et al. | |
| 5,996,559 A | * 12/1999 | Busato et al. | 123/520 |
| 6,102,016 A | 8/2000 | Sitar et al. | |
| 6,105,556 A | * 8/2000 | Takaku et al. | 123/520 |
| 6,135,415 A | 10/2000 | Kloda et al. | |
| 6,382,195 B1 | 5/2002 | Green et al. | |
| 6,435,169 B1 | 8/2002 | Vogt | |
| 6,494,041 B1 | 12/2002 | Lebold | |
| 2003/0084887 A1 | 5/2003 | Veinotte | |
| 2003/0116146 A1 | 6/2003 | Fensom et al. | |
| 2004/0177839 A1 | 9/2004 | Veinotte | |

FOREIGN PATENT DOCUMENTS

| | | |
|---|---|---|
| EP | 0 840 000 | 5/1998 |
| JP | 11 294267 | 10/1999 |
| JP | 2000-45879 | 2/2000 |

OTHER PUBLICATIONS

U.S. Appl. No. 10/164,559, filed Feb. 15, 2002, Veinotte.
U.S. Appl. No. 10/290,441, filed Nov. 8, 2002, Veinotte.
U.S. Appl. No. 10/387,439, filed Mar. 14, 2003, Veinotte.
U.S. Appl. No. 10/387,416, filed Mar. 14, 2003, Veinotte.

* cited by examiner

*Primary Examiner*—Weilun Lo

(57) ABSTRACT

A fuel vapor surge system includes a fuel tank, an intake passage, a fuel vapor storage canister in the fluid communication with the fuel tank, a vapor purge passage in fluid communication with the intake passage and the fuel vapor storage canister, and a closing member movably mounted in the intake passage. The closing member has a first position where the closing member blocks fluid communication between the intake passage and the vapor purge passage and is outside of a fluid stream of the intake passage when fluid is flowing through the intake passage and a second position where the closing member opens fluid communication between the intake passage and the vapor purge passage and extends into the fluid stream of the intake passage when fluid is flowing through the intake passage.

18 Claims, 6 Drawing Sheets

US 6,848,432 B2

PURGE CONTROL DEVICE FOR LOW VACUUM CONDITION

BACKGROUND OF THE INVENTION

One conventional fuel vapor purge control system for internal combustion engines relies upon a vacuum created in the intake manifold of the engine to draw fuel vapor from a canister into the engine. A purge valve opens and closes fluid communication between the canister and the intake manifold. Full throttle conditions can diminish the vacuum in the intake manifold such that the desired flow rate of fuel vapor cannot be achieved.

SUMMARY OF THE INVENTION

There is provided a fuel vapor purge system includes a fuel tank, an intake passage, a fuel vapor storage canister in fluid communication with the fuel tank, a vapor purge passage in fluid communication with the intake passage and the fuel vapor storage canister, and a closing member movably mounted in the intake passage. The closing member has a first position where the closing member blocks fluid communication between the intake passage and the vapor purge passage and is outside of a fluid stream of the intake passage when fluid is flowing through the intake passage and a second position where the closing member opens fluid communication between the intake passage and the vapor purge passage and extends into the fluid stream of the intake passage when fluid is flowing through the intake passage.

There is also provided fuel vapor purge system including a fuel vapor storage canister adapted to receive and store fuel vapor generated in a fuel tank, an intake passage in fluid communication with the fuel vapor storage canister and a closing member. The closing member has a first position where the closing member blocks fluid communication between the intake passage and the fuel vapor storage canister and is outside of a fluid stream of the intake passage when fluid is flowing through the intake passage and a second position where the closing member opens fluid communication between the intake passage and the fuel vapor storage canister and extends into the fluid stream of the intake passage when fluid is flowing through the intake passage.

There is yet also provided a fuel vapor purge system including an intake passage, a vapor purge passage joining the intake passage at a junction and in fluid communication with the intake passage, and a closing member having a first position where the closing member blocks fluid communication between the intake passage and the vapor purge passage and a second position where the closing member permits fluid communication between the intake passage and the vapor purge passage and creates a pressure differential across the junction so that the fluid is forced into the intake passage.

There is further provided a method for controlling fuel vapor purge for an internal combustion engine including an vapor purge passage in fluid communication with an intake passage and a port fluidly joining the intake passage and the vapor purge passage. The method includes simultaneously positioning a closing member to open fluid communication between the intake passage to the vapor purge passage and creating, with the closing member, a pressure differential across the port so that the fluid is drawn into the intake passage.

BRIEF DESCRIPTION OF THE DRAWINGS

The accompanying drawings, which are incorporated herein and constitute part of this specification, illustrate an embodiment of the invention, and, together with the general description given above and the detailed description given below, serve to explain the features of the invention.

DETAILED DESCRIPTION OF THE PREFERRED EMBODIMENTS

Figure 1:
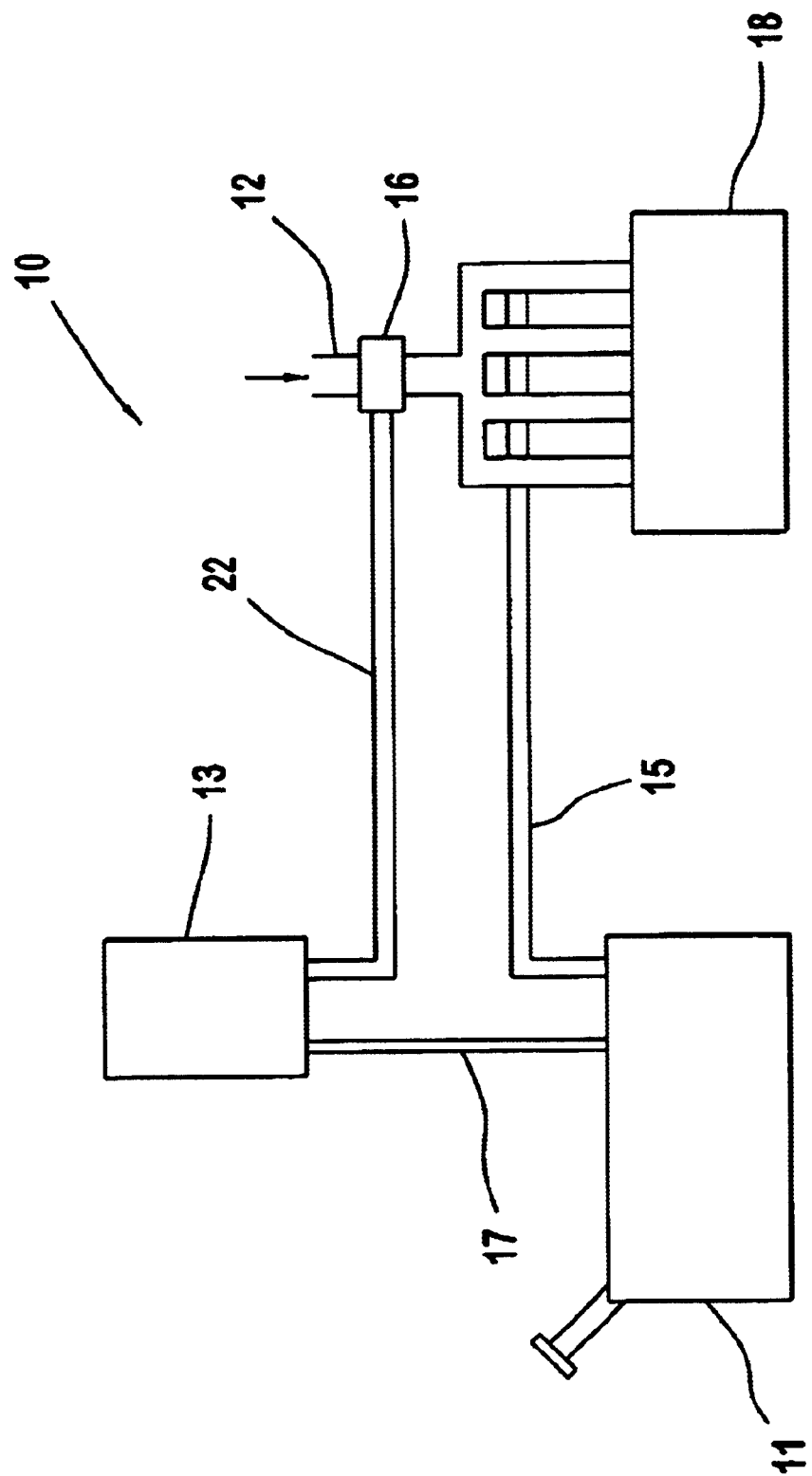
FIG. 1 is a schematic in accordance with an fuel vapor purge system for an internal combustion engine according to the present invention.

Referring to FIG. 1, a fuel vapor purge system 10 includes fuel tank 11 in fluid communication with a fuel vapor storage canister 13. The fuel vapor purge system 10 can be used to collect fuel vapor from the tank 111 and supply fuel vapor to an internal combustion engine 18 to control the emissions of fuel vapors from the fuel tank 11. Fuel vapor generated in the tank 11 passes into the fuel vapor storage canister 13 where the vapor is stored until an appropriate time for purging into the engine 18. The fuel tank 11 and the canister 13 are in fluid communication with the engine 18 by way of an intake conduit 12. The intake conduit 12 can be a manifold in fluid communication with a plurality of combustion chambers (not shown) of the engine 18. A fuel supply conduit 15 is connected between the fuel tank 11 and the intake conduit 12 to provide liquid fuel to the engine 18 for combustion.

A vapor supply conduit 17 is connected between the fuel tank 11 and the fuel vapor storage canister 13. Fuel vapor generated in the fuel tank 11 exits the tank 11 and enters the canister 13 by way of the vapor supply line 17. A vapor purge conduit 22 is in fluid communication with the fuel vapor canister 13 and the intake conduit 12. A flow control body is mounted between the intake conduit 12 and the vapor purge 22 conduit to selectively open and close the fluid communication between the intake conduit 12 and the canister 13. As will be explained below, the flow control body 16 can be mounted on the intake conduit 12 either upstream or downstream of a throttle body (not shown), which is used to control the speed and power of the engine.

When the flow control body 16 opens communication between the canister 13 and the intake conduit 12, the fuel vapor exits the canister 13, passes through the purge conduit 22, and enters the intake conduit 12 to mix with an intake charge flowing in the intake conduit 12 on route to a combustion chamber (not shown) of the engine 18.

Figure 2:
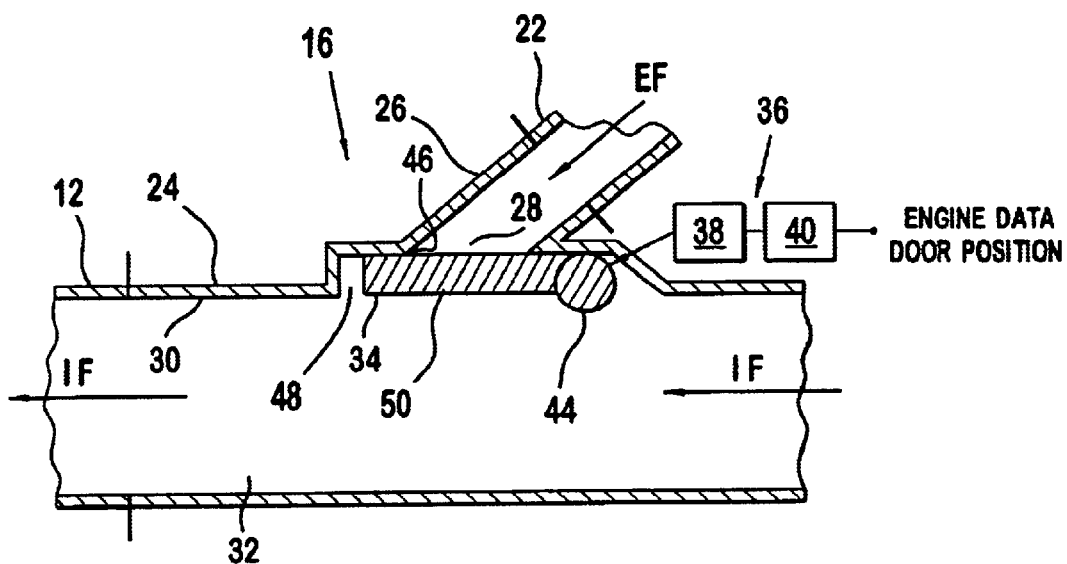
FIG. 2 is a schematic the fuel vapor purge system of FIG. 1 with the closing member in a first operating condition.
Figure 3:
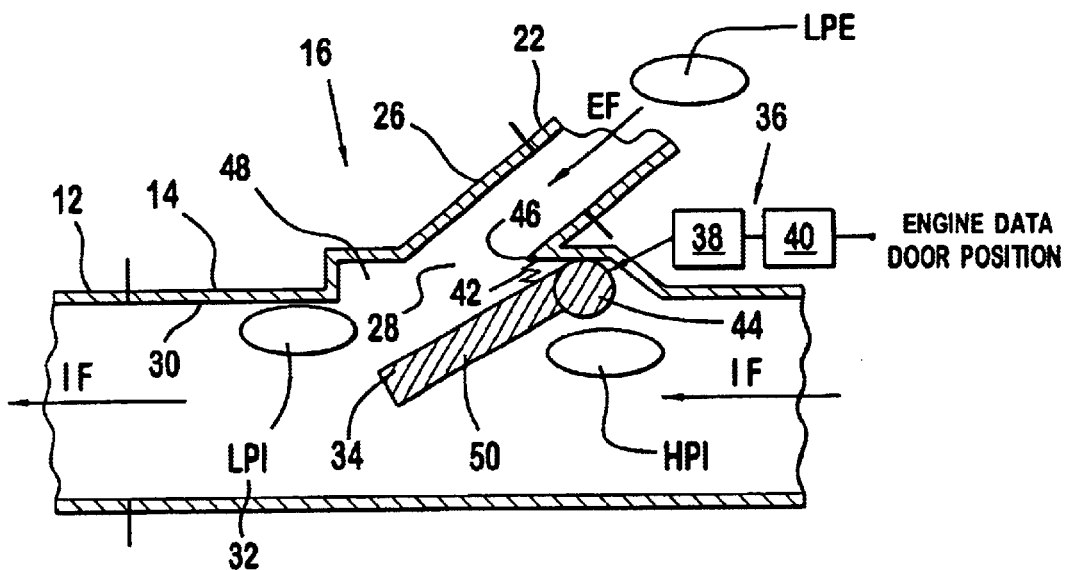
FIG. 3 is a schematic of the fuel vapor purge system of FIG. 1 with the closing member in a second operating condition.

Referring to FIGS. 2 and 3, the flow control body 16 includes a manifold conduit 24 in fluid communication with the intake conduit 12 and an inlet conduit 26 in fluid communication with the manifold conduit 24 and the vapor purge conduit 22. The manifold conduit 24 includes an opening 28 and an inner surface 30 defining a fluid passageway 32.

A closing member 34 is movably mounted in the manifold conduit 24. The closing member 34 performs two functions. First, it opens and closes the opening 28 to selectively open and close the fluid communication between the intake conduit 12 and the canister 13. Second, after the closing member 34 opens the fluid communication between the intake conduit 12 and the canister 13, the closing member 34 meters the flow rate of fuel vapor that passes from the canister 13 to the intake conduit 12.

An actuator assembly 36 includes a servo assembly 38 drivingly coupled to the closing member 34 and a servo controller 40 electrically connected to the servo assembly 38 and a return spring 42 biasing the closing member 34 toward the opening 28. Preferably, the servo assembly 38 includes an electric motor (not shown) drivingly coupled to a gear train (not shown). The servo controller 40 generates a actuator signal and sends it to the servo assembly 38 to move the closing member 34 from the first position to the second position. Preferably, the servo controller 40 follows a closed-loop algorithm using an engine performance data input and a door position input. Alternatively, the servo controller 40 can follow an open-loop algorithm and additional inputs can be provided to the servo controller 40, such as transmission gear selection and vehicle inclination.

Comparing FIGS. 2 and 3, the closing member 34 is movable between a first position (FIG. 2) where the closing member 34 blocks fluid communication between the intake conduit 12 and the canister 13 and a second position (FIG. 3) where the closing member 34 opens fluid communication between the intake conduit 12 and the canister 13 and selectively meters the flow rate of fuel vapors passing into the intake conduit 12. The fuel vapor flows through the purge conduit 22 in the direction indicated by arrow EF.

FIGS. 2 and 3 schematically represent the closing member 34 as a door pivoting at one end about a rotary shaft 44. Alternatively, the closing member 34 can be displaced in a different manner between the first position and the second position, such as sliding along a linear path. The servo assembly 38 can include any suitable driving mechanism that imparts the chosen pivoting motion, linear motion or other motion on the closing member, such as, an electric or pneumatic motor with or without a gear train, or a solenoid with or without a linkage.

When in the first position, as shown in FIG. 2, the closing member 34 lies adjacent the inner surface 30 of the intake conduit 12 and engages a seat 46 surrounding the opening 28 to seal the opening 28 and block the flow of fuel vapor from the purge conduit 22 into the intake conduit 12. Preferably, the closing member 34 is positioned in the fluid passageway 32 to minimize disturbance by the closing member 34 of the fluid flowing in the fluid passageway 32 when the closing member 34 is in the first position. As shown in FIGS. 2 and 3, this can be achieved by providing a recess 48 at a location in the inner surface 30 which surrounds the opening 28. The recess 48 receives the closing member 34 so that the closing member 34 lies approximately coplanar with the inner surface 30 when the closing member 34 is in the first position. Alternatively, a ramp can be providing on the inner surface 30 that diverts the fluid flowing in the fluid passageway 32 over the closing member 34.

When in the second position, as shown in FIG. 3, the closing member 34 is disengaged from the valve seat 46 to open the opening 28 and permit fluid communication between the purge conduit 22 and the intake conduit 12. In the second position, the closing member 34 extends away from purge conduit 22 and extends into the fluid passageway 32 to affect the fluid flowing in the intake conduit 12. By extending into the fluid passageway 32, the closing member 22 creates a high pressure region HPI in the intake passage 12 that is upstream of the opening 28 and an intake low pressure region LPI in the intake conduit 12 that is downstream of and adjacent to the recirulation opening 28. The closing member 34 can vary the pressure value of the intake low pressure region LPI by the amount to which it extends into the fluid passageway 32 such that the pressure differential between the canister 13 and the intake conduit 12 is sufficient to draw fuel vapor into the intake conduit 12 for all throttle positions. As will be explained below, by varying the pressure value of the intake low pressure region LPI, the closing member 34 can meter the volume of fuel vapor entering the intake conduit 12 from the purge conduit 22.

During the intake cycle of the engine, the purge conduit 22 has a low pressure region LPE that is approximately equal to ambient atmospheric pressure. The closing member 34 further includes an operative surface 50 that causes the fluid flowing in the fluid passageway 32 to separate from a portion of the inner surface 30 adjacent the opening 28. This separation creates the intake low pressure region LPI. When the closing member 34 initially extends into the fluid passageway 32 (e.g., 10 degrees relative to a plane containing the opening), partial separation of the fluid occurs and the value of the intake low pressure region LPI is less than a maximum value. When the closing member 34 extends far enough into the fluid passageway 32 to cause full separation (e.g., 35 degrees relative to a plane containing the opening), then the value of the intake low pressure region LPI reaches a maximum value. The extent to which of the operative surface 50 reaches into the fluid passageway 32 controls the value of the intake low pressure region LPI and, thus, the pressure differential between the purge low pressure region LPE and the intake low pressure region LPI during the intake cycle of the engine 18. The operative surface 50 can be positioned in the fluid passageway such that the pressure differential is sufficient to draw fuel vapor into the intake conduit 12 even when the throttle body is in a full open condition.

Advantageously, the flow control body 16 can be used with hybrid powertrains, e.g., an internal combustion engine coupled with an electric propulsion motor, where the internal combustion engine normally operates under a full open condition of the throttle body. Further, because the flow control body 16, not the throttle body, creates the pressure differential for drawing fuel vapor from the canister 13 into the intake conduit 12, the flow control body 16 can be mounted along the intake conduit 12 at a position either upstream or downstream from the throttle body. This feature of the flow control body 16 can remove restraints on packaging because the flow control body 16 can be position anywhere along the intake conduit 12 where space permits.

The operative surface 50 is, preferably, configured in a shape different than the boundary shape of the inner surface 30 of the fluid passageway 32 to provide an adequate value for the intake low pressure region LPI and to promote mixing of the fuel vapor from the canister 13 with the fluid flowing in the fluid passageway 32. Preferably, the fuel vapor is mixed with the fluid flowing in the fluid passageway 32 so that each combustion chamber (not shown) of the engine 18 receives at least some of the fuel vapor passing through the opening 28. The selected geometry must balance with the capacity of the actuator assembly 36 and the effect the operative surface 50 has on flow restriction in the intake conduit 12. The actuator assembly 36 should be of a configuration capable of generating sufficient force to move the closing member 34 between the first position and second position against the resistance created by the fluid flowing in the fluid passageway 32 against the closing member 34 while simultaneously requiring a minimum packaging volume. It is preferred that the restriction of the fluid passageway 32 by the closing member 34 minimally affect the fluid flowing through the fluid passageway 32 to the combustion chamber during the intake cycle and, thus, the power production of the engine 18.

The geometry of the operative surface 50 and relationship between the angle of the closing member 34 and the amount of fuel vapor that enters the fluid passageway 32 are analogous to the control of exhaust gas entering the intake conduit as described in a U.S. patent application Ser. No. 10/290,497, filed on Nov. 8, 2002, entitled "Apparatus and Method for Exhaust Gas Flow Management of an Exhaust Gas Recirculation System", which application is hereby incorporated by reference.

The pressure of the fluid flowing in the intake conduit 12 is approximately equal to ambient atmospheric pressure if the engine is a normally aspirated engine and is greater than ambient atmospheric pressure if the engine is a turbocharged engine. As the closing member 34 moves away from the vapor purge conduit 22 and toward the second position (FIG. 3), the intake low pressure region LPI is created adjacent the opening 28 and has a value slightly less than that of the pressure of the fluid flowing in the intake conduit 12. As the closing member 34 moves farther into the fluid passageway toward the second position, the value of the intake low pressure region LPI approaches a pressure value lower than both of LPE and HP1. The pressure differential between the intake low pressure region LPI in the intake conduit 12 and the purge low pressure region LPE in the vapor purge conduit 22 draws fuel vapor from the canister 13 into the intake conduit 12 through the opening 28. The amount of fuel vapor that enters the intake conduit 12 is proportional to the pressure differential between the intake low pressure region LPI and the purge low pressure region LPE. The pressure value of the purge low pressure region LPE remains relatively steady over time. Thus, a change in the flow rate of fuel vapor in the intake conduit 12 can be varied by varying the pressure value of the intake low pressure region LPI.

The extent to which of the closing member 34 reaches into the fluid passageway controls the value of the intake low pressure region LPI and, thus, the pressure differential between the intake low pressure region LPI and the purge low pressure region LPE during the intake cycle of the engine. When the closing member 34 first opens, the closing member 34 reaches into the fluid passageway 32 by a small amount and the intake low pressure region LPI has a value only slightly less than that of the purge low pressure region LPE. Accordingly, the pressure differential is small and the flow rate of fuel vapor through the opening 28 and into the intake conduit 12 is correspondingly small. The pressure value of the intake low pressure region LPI, and thus the pressure difference and flow rate of fuel vapor passing through the opening 28, increases as the closing member 34 reaches farther into the fluid passageway 32 of the manifold conduit 24. Therefore, closing member 34 opens fluid communication between the intake conduit 12 and the canister 13 and the closing member 34 also meters the amount of fuel vapor passing into the intake conduit 12.

Additionally, for a given position of the closing member 34 where the closing member reaches into the fluid passageway 32, the flow rate of the fuel vapor is generally directly proportional to the flow rate of the fluid in the intake conduit 12. That is, the throttle body can be used to vary the amount of fuel vapor purged from the canister 13, after the closing member 34 is placed in an open position. Therefore, the closing member 34 can be designed with a maximum of two positions—opened and closed—and the normal operation of the throttle body can be used to vary the flow rate of fuel vapor purged from the canister.

FIGS. 4–7 illustrate an embodiment of a modular purge control assembly 100 according to the fuel vapor purge system 10 schematically represented in FIGS. 1–3. The modular purge control assembly 100 integrates a flow control body 116, a closing member 134, and an actuator assembly 136 into a modular unit. The modular purge control assembly can be configured as a single component for assembly with the engine. This can reduce the part count for the engine. The modular purge control assembly 100 is assembled to the engine by connecting the modular purge control assembly 100 to each of the intake conduit and the purge conduit and the number of assembly steps can be minimized because the number of components for assembly is reduced.

The flow control body 116 includes a manifold conduit 124 and an inlet conduit 126 in fluid communication with the manifold conduit 124. As described above with reference to FIGS. 1–3, the manifold conduit 124 can be placed in fluid communication with an intake conduit (e.g., at 12 in FIGS. 1–3) and the inlet conduit 126 can be placed in fluid communication with a purge conduit and a canister (e.g., 22 and 13 in FIGS. 1–3).

Figure 4:
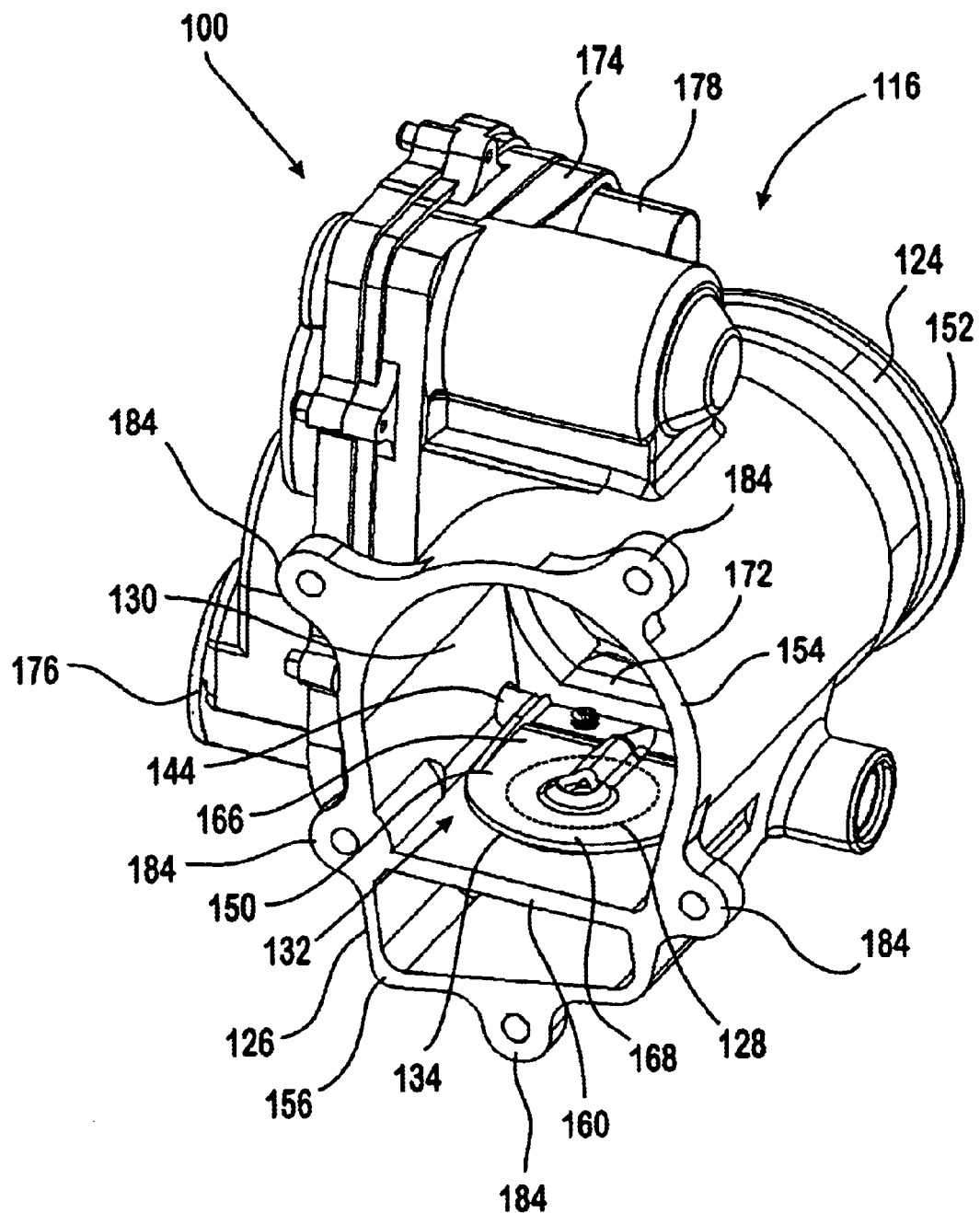
FIG. 4 is a perspective view of an embodiment of a flow control body for an fuel vapor purge system according to the invention.
Figure 5:
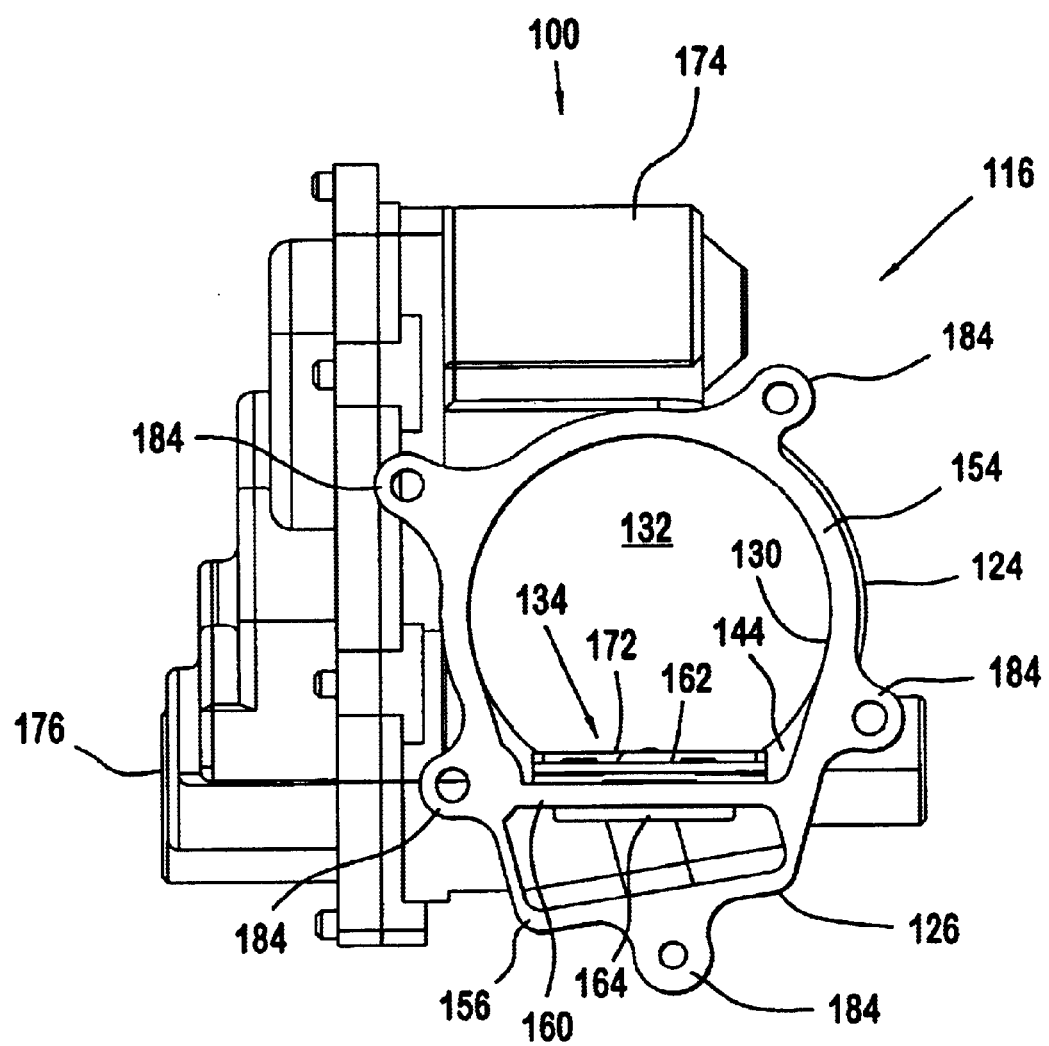
FIG. 5 is an end view of the flow control body according to FIG. 4.
Figure 6:
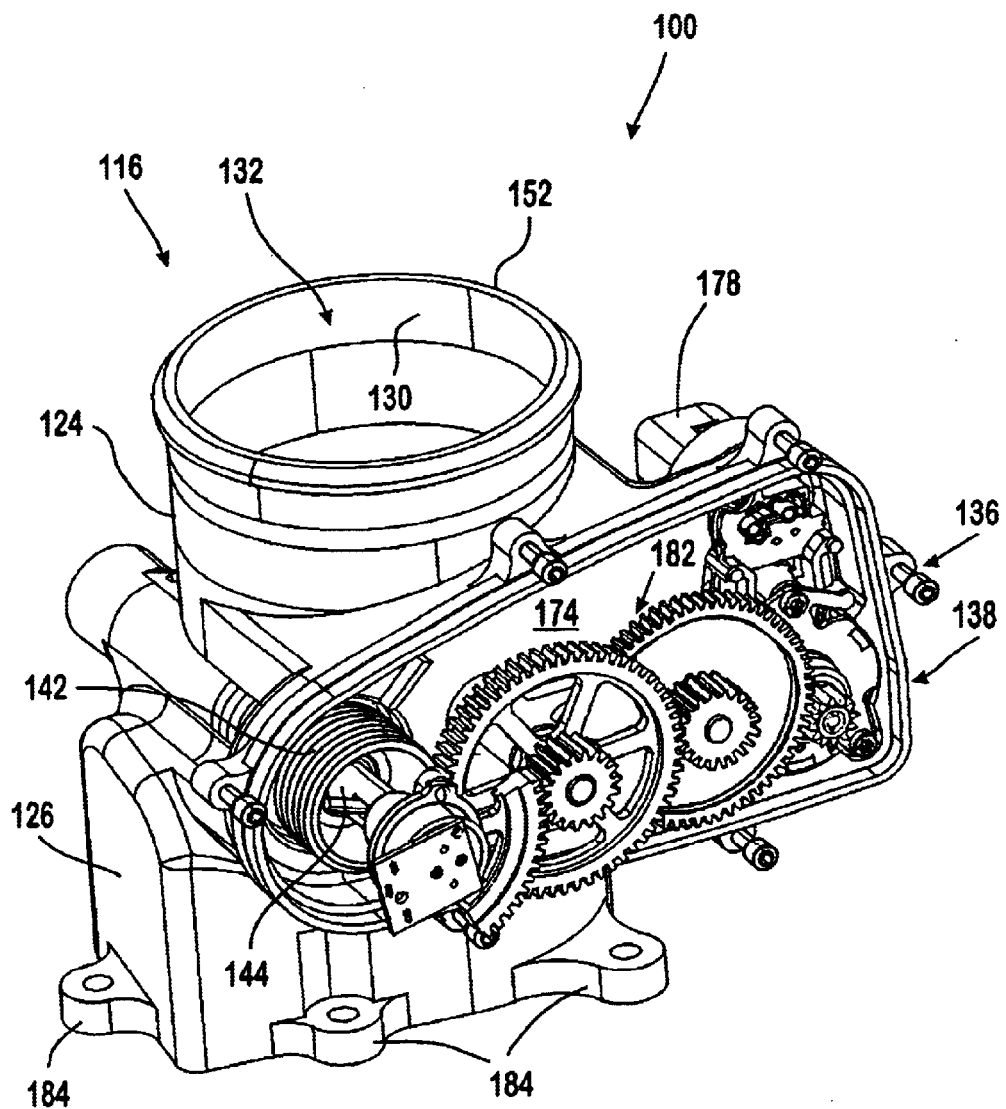
FIG. 6 is another perspective view of the flow control body according to FIG. 4 in a partially assembled state.

The manifold conduit 124 includes a opening 128 (in phantom in FIG. 4) and an inner surface 130 defining a fluid passageway 132. The opening 128 is in fluid communication with the inlet conduit 126. The inner surface 130 extends from a first open end 152 to a second open end 154. As shown in FIGS. 4 and 6, the first open end 152 includes a circular cross-sectional shape. FIGS. 4 and 5 show the second open end 154 to include a non-circular cross-sectional shape.

Referring to FIGS. 4 and 5, the inlet conduit 126 extends parallel to the manifold conduit 124 from the opening 128 to a third open end 156. The third open end 156 is adjacent to and coplanar with the second open end 154 of the manifold conduit 124 and includes a trapezoidal cross-sectional shape.

A common wall 160 forms a portion of the manifold conduit 124 and a portion of the inlet conduit 126. A compact size can be achieved for the flow control body 116 because the inlet conduit 126 extends parallel to the manifold conduit 124 and the common wall 160 is shared by the inlet conduit 126 and the manifold conduit 124. This compact size can improve the packaging efficiency of the fuel vapor purge system around the engine and within the engine compartment.

Referring to FIG. 4, the common wall 160 can include the opening 128 (phantom), which is defined by a cylindrical wall or seat (not shown).

A closing member 134 is movably mounted in the manifold conduit 124 between a first position where the closing member 134 seals the opening 128 and blocks fluid communication between the intake conduit and the canister (e.g., 12 and 13 of FIGS. 1–3) and a second position (not shown) where the closing member 134 opens opening 128 and permits fluid communication between the intake conduit and the canister and selectively meters the flow rate fuel vapor passing into the intake conduit. FIGS. 4 and 5 show the closing member 134 in the first position represented schematically in FIG. 2.

Figure 7:
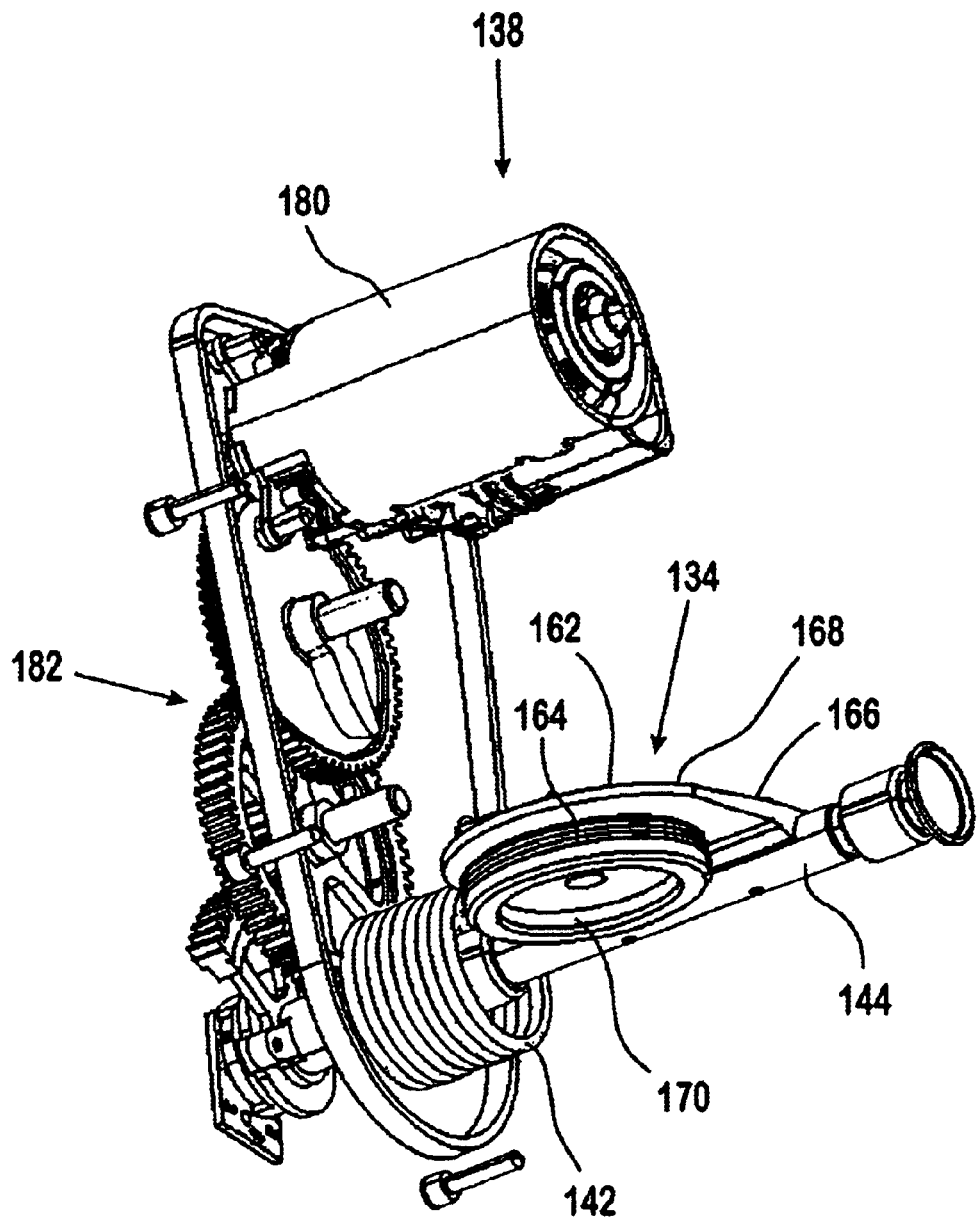
FIG. 7 is a perspective view of the actuator assembly according to FIG. 6.

Referring to FIGS. 4, 5 and 7, the closing member 134 includes a flapper door 162, a seal 164 on the flapper door 162, and a rotary shaft 144 pivotally coupling the flapper door 162 to the flow control body 116. The flapper door 162 has a rectangular base 166 and a semicircular end 168. The rectangular base 166 of the flapper door 162 is fixed to the rotary shaft 144. Referring to FIGS. 5 and 7, a cylindrical projection 170 extends from flapper door 162 adjacent the semicircular end 16. The seal 164 is mounted about the periphery of a cylindrical projection 170.

Referring to FIG. 5, when the flapper door 162 is in the first position, the cylindrical projection 170 extends through the opening 128 and the seal 164 engages the seat (not shown) to block the opening 128 and close fluid communication between the intake conduit and the canister (see FIGS. 2 and 5). The flapper door 162 pivots about the rotary shaft 144 to the second position (not shown) such that the flapper door 162 extends away from the opening 128 and into the fluid passageway 132.

Referring to FIGS. 4 and 5, a ramp 172 is located in the fluid passageway 132 of the manifold conduit 124 adjacent the rectangular base 166 of the flapper door 162. The ramp 172 extends from the inner surface 130 of the manifold conduit 124 to a height at least equal to the thickness of the closing member 134. The ramp 172 deflects fluid flowing through the fluid passageway 132 away from the closing member 134 when the closing member is in the first position. This minimizes disturbance by the closing member 134 to the fluid flowing in the fluid passageway 132 when the closing member 134 is in the first position.

Other arrangements are possible to minimize disturbance by the closing member 134 of the fluid flowing through the fluid passageway 132 when the closing member 134 is in the first position, such as, providing a recess in the inner surface 130 to receive the closing member 134, as described with reference to FIGS. 2 and 3.

Referring to FIGS. 4–6, the flow control body 116 also can include an actuator receptacle 174 extending from the manifold conduit 124. The actuator assembly 136 is received in the actuator receptacle 174 and is coupled to the rotary shaft 144. Preferably, the actuator receptacle 174 is integrally formed with the manifold conduit 124 and the inlet conduit 126. The actuator assembly 136 can be inserted into the actuator receptacle 174. Alternatively, the flow control body 116 can be overmolded about the actuator assembly 136.

The actuator assembly 136 drives the rotary shaft 144 and moves the closing member 134 between the first position and the second position against the bias of the return spring 142. As shown in FIGS. 4 and 5, an actuator cover 176 extends over the actuator assembly 136 and connects to the actuator receptacle 174 to enclose the actuator assembly 136. Referring to FIGS. 4 and 6, the actuator cover 176 can include an electrical receptacle 178 electrically connected to the servo controller.

Referring to FIGS. 6 and 7, the actuator assembly 136 includes a servo assembly 138 drivingly coupled to the closing member 134 and a servo controller (not shown) electrically connected to the servo assembly 138, and a return spring 142 connected to the closing member 134. The return spring 142 biases the closing member 134 toward the first position. Preferably, the return spring 142 includes a torsion spring coiled about the rotary shaft 144 with one end secured to the rotary shaft 144 and the other end secured to the flow control body 116. Preferably, the servo assembly 138 includes a d.c. motor 180 (FIG. 7) driving a gear train 182, with the gear train 182 driving the rotary shaft 144. Alternatively, the servo assembly 138 can include other driving arrangements, such as, an electric torque motor with or without a gear train, a pneumatic actuator, a hydraulic actuator, or a solenoid with or without a linkage.

The servo controller generates a actuator signal and sends it to the servo assembly 138 to move the closing member 134 from the first position to the second position. Preferably, the servo controller follows a closed-loop algorithm using an engine performance data input and a door position input. Alternatively, the servo controller can follow an open-loop algorithm and additional inputs can be provided to the servo controller, such as transmission gear selection and vehicle inclination.

As shown in FIGS. 4–6, it is preferable to space a plurality of bolt flanges 184 about the perimeter of the second open end 154 and the third open end 156. The bolt flanges 158 are adapted to receive bolts for securing the flow control body 116 to the intake conduit and the vapor purge conduit. Alternatively, other arrangements can be used to secure the flow control body 116 to the intake conduit and the purge conduit, such as, clamps, crimped flanges, solder, and flexible conduit.

While the present invention has been disclosed with reference to certain embodiments, numerous modifications, alterations and changes to the described embodiments are possible without departing from the sphere and scope of the present invention, as defined in the appended claims. Accordingly, it is intended that the present invention not be limited to the described embodiments, be that it has the full scope defined by the language of the following claims, and equivalents thereof.

What we claim is:

1. A fuel vapor purge system comprising:
   a fuel tank;
   an intake passage;
   a fuel vapor storage canister in fluid communication with the fuel tank;
   a vapor purge passage in fluid communication with the intake passage and the fuel vapor storage canister; and
   a closing member pivotably mounted in the intake passage and having:
      a first position where the closing member blocks fluid communication between the intake passage and the vapor purge passage and is outside of a fluid stream of the intake passage when fluid is flowing through the intake passage; and
      a second position where the closing member opens fluid communication between the intake passage and the vapor purge passage and extends into the fluid stream of the intake passage when fluid is flowing through the intake passage.

2. The fuel vapor purge system according to claim 1, further comprising:
   a port between and in fluid communication with the intake passage and the fuel vapor passage;
   the closing member closing the port when the closing member is in the first position; and
   the closing member opening the port when the closing member is in the second position.

3. The fuel vapor purge system according to claim 2, wherein the closing member includes a seal engaging the port when the closing member is in the first position.

4. The fuel vapor purge system according to claim 3, wherein the intake passage comprises a recess in an inner wall of the intake passage to receive the closing member when the closing member is in the first position.

5. The fuel vapor purge system according to claim 4, wherein the port being located in the recess.

6. The fuel vapor purge system according to claim 1, wherein the closing member comprises a rectangular base and a semicircular end.

7. A fuel vapor purge system comprising:
 a fuel vapor storage canister adapted to receive and store fuel vapor generated in a fuel tank;
 an intake passage in fluid communication with the fuel vapor storage canister; and
 a pivotable closing member having:
  a first position where the closing member blocks fluid communication between the intake passage and the fuel vapor storage canister and is outside of a fluid stream of the intake passage when fluid is flowing through the intake passage; and
  a second position where the closing member opens fluid communication between the intake passage and the fuel vapor storage canister and extends into the fluid stream of the intake passage when fluid is flowing through the intake passage.

8. The fuel vapor purge system according to claim 7, comprising a vapor purge passage disposed between the intake passage and the fuel vapor storage canister, wherein the closing member extends away from the vapor purge passage when the closing member is in the second position.

9. The fuel vapor purge system according to claim 7, further comprising:
 a port in fluid communication with the intake passage and a vapor purge passage; and
 a drive assembly supported on the intake passage and drivingly engaging the closing member;
 wherein the closing member sealing the port when the closing member is in the first position, and opening the port when the closing member is in the second position.

10. The fuel vapor purge system according to claim 9, wherein the closing member comprises:
 a door pivotally coupled to the intake passage and pivoting into the fluid stream when the closing member moves from the first position to the second position; and
 a seal mounted on the door;
 the port including a valve seat; and
 the seal engaging the valve seat to seal the port when the movable member is in the first position.

11. The fuel vapor purge system according to claim 10, wherein the drive assembly comprises:
 a servo assembly drivingly coupled to the door;
 a servo controller electrically connected to the servo assembly and actuating the servo assembly to move the door from the first position to the second position; and
 a spring connected to the door to bias the door toward the first position; and
 the servo controller actuating the servo assembly to move the door from the first position to the second position against the bias of the spring.

12. The fuel vapor purge system according to claim 11, wherein the servo controller comprises a closed-loop controller including:
 an engine data input; and
 a door position input.

13. The fuel vapor purge system according to claim 12, wherein the drive assembly further comprises:
 a housing supported on the intake passage and containing the servo assembly and the servo controller; and
 an electrical connector adapted to connect to an electrical power supply.

14. A fuel vapor purge system comprising:
 an intake passage;
 a vapor purge passage joining the intake passage at a junction and in fluid communication with the intake passage; and
 a closing member pivoting between a first position where the closing member blocks fluid communication between the intake passage and the vapor purge passage and a second position where the closing member permits fluid communication between the intake passage and the vapor purge passage and creates a pressure differential across the junction so that the fluid is forced into the intake passage.

15. The fuel vapor purge system according to claim 14, wherein the vapor purge passage has a pressure in a region upstream of the junction;
 the closing member creates a pressure in a region of the intake passage downstream of the junction that is less than the pressure in the vapor purge passage region; and
 the pressure differential is the difference between the pressure in the intake passage region and the pressure in the vapor purge passage region.

16. A method for controlling fuel vapor purge for an internal combustion engine including an vapor purge passage in fluid communication with an intake passage and a port fluidly joining the intake passage and the vapor purge passage, the method comprising:
 simultaneously pivoting a closing member to open fluid communication between the intake passage to the vapor purge passage and creating, with the closing member, a pressure differential across the port so that the fluid is either drawn or forced into the intake passage.

17. The method according to claim 16, further comprising varying the position of the closing member to vary the pressure differential while maintaining the open fluid communication between the intake passage and the vapor purge passage.

18. The method according to claim 17, wherein creating the pressure differential comprises creating a low pressure region in the intake passage downstream of the port having a pressure that is less than a pressure in a region of the vapor purge passage upstream of the port.

* * * * *